3,001,991
16α,17α-ISOALKYLIDENEDIOXY-4-PREGNENE-
3,20-DIONES
George R. Allen, Evansville, Ind., and Martin J. Weiss,
Oradell, N.J., assignors to American Cyanamid Company, New York, N.Y., a corporation of Maine
No Drawing. Filed Oct. 13, 1959, Ser. No. 846,055
7 Claims. (Cl. 260—239.55)

This invention relates to new steroid compounds. More particularly, it relates to 16α,17α-substituted alkylidenedioxy steroids of the progesterone series.

It is known in the past that 16α,17α-isopropylidenedioxypregnanes can be prepared from the corresponding 16α,17α-dihydroxypregnane. [J. Chem. Soc., 4373 (1955)].

We have now found that alkylidenedioxy steroids having the following general formula have high physiological activity.

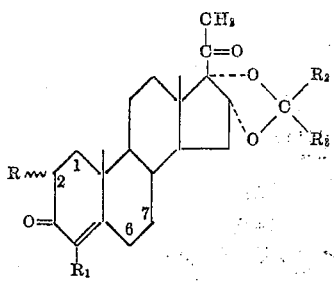

wherein —$C_1$—$C_2$— and —$C_6$—$C_7$— are selected from the group consisting of —CH=CH— and

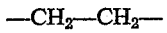

—$CH_2$—$CH_2$—

R and $R_1$ are selected from the group consisting of hydrogen and halogen atoms, at least one being halogen when the steroid nucleus contains less than two double bonds and $R^2$ and $R_3$ are lower alkyl radicals.

The compounds of the present invention are in general crystalline solids and insoluble in water. They are crystallizable from organic solvents such as toluene, benzene, petroleum ether and the like or mixtures of organic solvents.

The compounds of the present invention are prepared from 16α,17α-isopropylidenedioxyprogesterone. The preparation of this compound is described by G. Cooley et al. J. Chem. Soc., 4373 (1955). The use of this latter compound in the preparation of the various compounds of this invention is illustrated in the following flowsheet.

In the following flowsheet, $R_2$ and $R_3$ are as hereinbefore described. The reactions taking place in the above flowsheet are described as follows. The treatment of A with excess ethyl oxalate in the presence of 1.1 molar equivalents of sodium methoxide in benzene solution at room temperature gives an amorphous ethoxalyl derivative, the structure of which is believed to be represented by Formula B. Treatment of B with one molar equivalent of bromine in methanol in the present of excess potassium acetate at about 0–5° C. gives 2α-bromo-16α,17α-isopropylidenedioxyprogesterone (C). When ethoxalyl derivative B is treated under similar conditions with two molar equivalents of bromine, 2α,4-dibromo-16α,17α-isopropylidenedioxyprogesterone (E) is obtained. This latter compound E can also be prepared from the mono-2α-bromide C by treatment with bromine in acetic acid in an ether solution containing a tertiary amine such as collidine at room temperature for about 50 hours in the dark.

Heating the 2α-bromide C in collidine solution for 45 minutes effects dehydrobromination and the 1,4-dienone F is obtained. Similar treatment of the 2α,4-dibromide E gives the 4-bromo-1,4-dienone I. Treatment of the 2α,4-dibromide E with sodium iodide in refluxing acetone gives the 2α-and/or-2β-iodo-4-bromide D. When D is treated with hot collidine, deiodination takes place and 4-bromo-16α,17α-isopropylidenedioxyprogesterone (G) is obtained. The latter compound G can also be obtained directly from 16α,17α-isopropylidenedioxyprogesterone (A) by treatment with bromine in acetic acid in the presence of propylene oxide which functions as an acid acceptor. Substitution of collidine for propyline oxide gives lower yields of G. A third method of synthesizing G is achieved by selective catalytic hydrogenation of the $C_1$—$C_2$ double bond in the 4-bromo-1,4-dienone I. Heating G with lithium chloride in refluxing collidine results in dehydrobromination and the 4,6-dienone H is obtained.

The compounds of the present invention possess progestational activity and are useful in place of known progestational steroids such as progesterone in the treatment, for example, of habitual abortion by administering in a similar type of parental preparation as progesterone with the activity of the particular compound determining the dosage used.

The following examples describe the preparation of compounds of the present invention in greater particularity and are intended to be by way of illustration and not limitation.

Example 1

A solution of 22 ml. of 1 N methanolic sodium methoxide in 90 ml. of benzene is distilled until 65 ml. of distillate is collected. The cooled residual mixture is treated with 4.82 g. (0.034 mole, 4.6 ml.) of ethyl oxalate with magnetic stirring; all of the solid dissolves. To this solution is added a solution of 7.72 g. of 16α, 17α-isopropylidenedioxyprogesterone in 50 ml. of benzene. The resulting orange solution is stirred at room temperature for 21 hours. The solvent is removed, and the residual gum is triturated with 100 ml. of dry ether to give a gelatinous solid that is collected by filtration. This material is dissolved in 250 ml. of water to give a slightly turbid orange solution which is filtered through a bed of diatomaceous earth. The filtrate is acidified with 5% hydrochloric acid solution; the precipitated amorphous, ivory-colored solid is collected by filtration to give 6.956 g. of 2-ethoxalyl-16α,17α-isoproxylidenedioxyprogesterone (72% yield when calculated as a monoethoxalyl derivative) of material which has $\lambda_{max.}^{242}$ ($E_{1cm.}^{1\%}$=246), 330mμ ($E_{1cm.}^{1\%}$=95), $\lambda_{max.}^{NaOH}$ 251 ($E_{1cm.}^{1\%}$=100), and $\lambda_{max.}$ 5.74, 5.82, 6.10, 7.21, 7.92μ (broad).

The ether filtrate from the removal of the gelatinous solid is taken to dryness, and the residue is dissolved in about 15 ml. of benzene. This solution is absorbed onto a column prepared from silica gel (column size: 1.6 x 16.5 cm.). The column is eluted with 20% ether-in-benzene solution; 250-ml. fractions are collected. The solid contained in the first fraction is recrystallized from benzene-petroleum ether to give 0.555 g. (7% recovery) of 16α,17α-isopropylidenedioxyprogesterone as flat, white needles, melting point 206–208° C. alone or when mixed with an authentic sample.

When the time of reaction is decreased to three hours, the yield of ethoxalyl derivative is 51 and 47% whereas starting material is recovered to the extent of 35 and 47%, respectively (two experiments).

Example II

A mixture of 0.730 g. (1.5 moles if calculated as a monethoxalyl derivative, prepared in Example I), 0.294 g. (3.0 moles) of potassium acetate and 12 ml. of methanol is chilled in an ice bath with magnetic stirring. A 0.58 M solution of bromine in carbon tetrachloride is added dropwise until a water-white solution results; this requires 2.9 ml. of the solution (equivalent to 1.68

FLOWSHEET

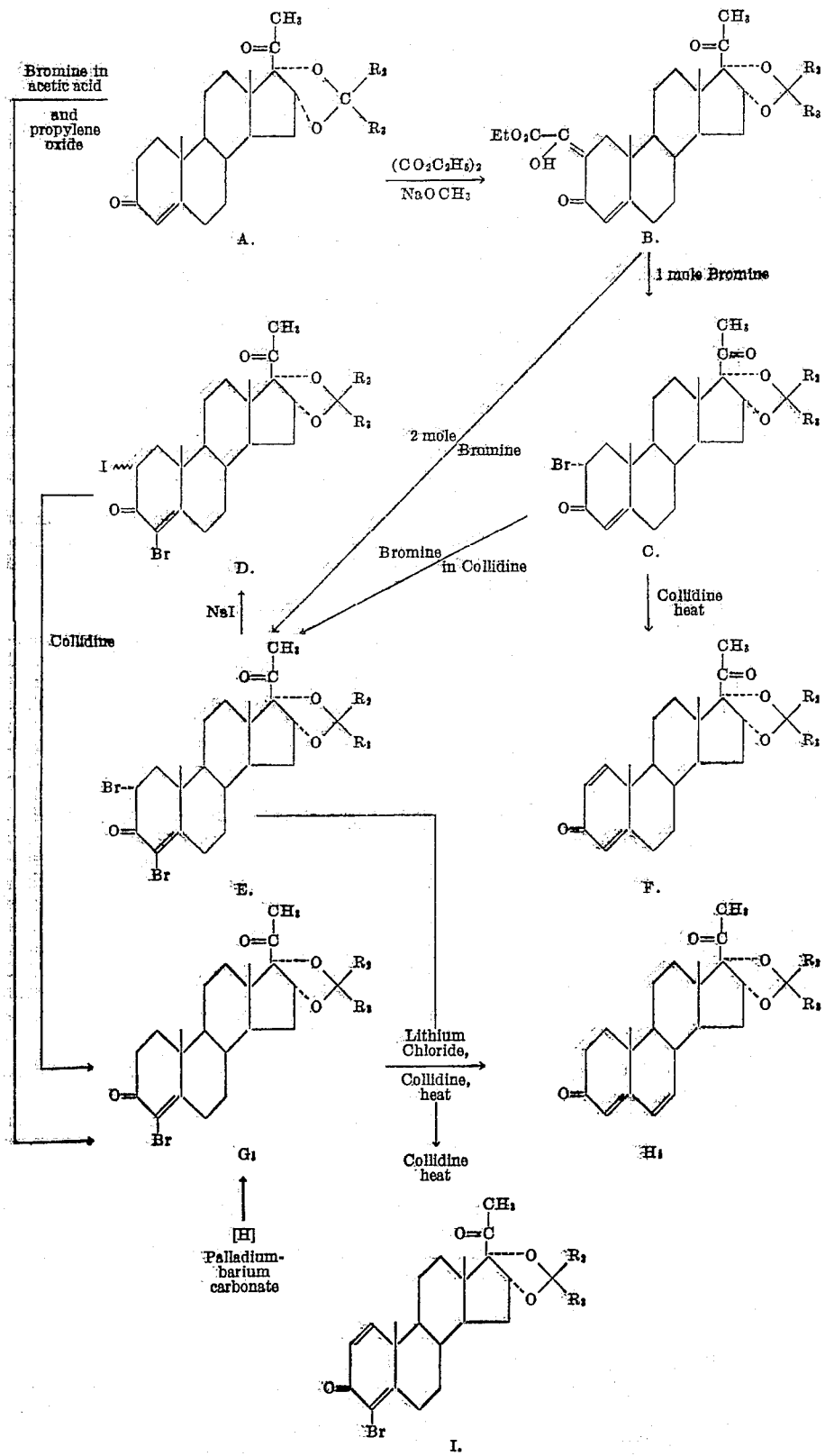

moles). An additional two-three drops of the bromine solution results in the persistence of bromine color for one-two minutes. The addition requires fifteen minutes, and all of the solid dissolves during the addition. The solution is then allowed to stir for another five minutes and concentrated on the steam bath to remove the carbon tetrachloride. Water is added slowly until a faint turbidity persists. The solution is chilled, and the walls of the container are scratched. The crystals that are deposited are recrystallized from acetone-petroleum ether to give 0.444 g. (62% yield) of 2α-bromo-16α,17α-isopropylidenedioxyprogesterone as a white solid, melting point 193–195° C. dec. The material has $[\alpha]_D^{25} + 118°$ (c. 1.1, methanol), $\lambda_{max}$ 243 mμ ($e = 11,100$), and $\lambda_{max}$ 5.85, 5.92 (less intense than 5.85 band) 6.16, 7.24, 7.28μ.

This material shows a tendency to separate as a gel from acetone-petroleum ether. On occasion it separates from acetone-petroleum ether as white needles, melting point 187–189° C. dec. The infrared spectra of the two forms are identical.

When the addition of bromine is followed by the addition of a molar equivalent of sodium methoxide, the bromoketone is isolated in 64% yield. Heat is not used in the removal of the carbon tetrachloride.

*Example III*

A mixture of 1.460 g. (3.0 moles if calculated as a monoethoxalyl derivative) of ethoxalyl derivative prepared in Example I, 0.588 g. of potassium acetate and 25 ml. of methanol is chilled in an ice bath with continuous stirring. This mixture is treated by dropwise addition over 14 minutes with 7.3 ml. of a 0.82 M solution of bromine in carbon tetrachloride; all of the solid dissolves during the addition. The yellow solution is stirred for an additional six minutes, and 6.0 ml. of a 1 N solution of sodium methoxide in methanol is then added. A precipitate of white solid separates immediately; the mixture is filtered, and the solid is washed with water to give 0.881 g. (52% yield) of 2α,4-dibromo-16α,17α-isopropylidenedioxyprogesterone as white crystals, melting point 164–165° dec. (gas bubbles).

The filtrate is concentrated to a volume of about 10 ml. and diluted with water. The amorphous solid is dissolved in the minimum amount of benzene and sorbed onto a column that is prepared from 60 g. of silica gel (column size: 2.8 x 17 cm.). The column is washed with a 5% ether-in-benzene solution; 125-ml. fractions are collected. The material contained in fractions 5–10 is combined and recrystallizes from acetone-petroleum ether to give 0.235 g. (17% yield) of 2α-bromo-16α,17α-isopropylidenedioxyprogesterone as a white solid, melting point 188–190° C. dec.; a mixture of this material with that obtained previously shows no depression and the infrared spectra of the two samples are identical.

In a second experiment the solution of the potassium acetate, ethoxalyl derivative B, methanol and the bromine in carbon tetrachloride is allowed to stir for four hours before the addition of the methanolic sodium methoxide. In this manner a 65% yield of the dibromoketone (E) is obtained. Chromatography of the amorphous material in the mother liquor fails to give any of the bromoketone (C).

*Example IV*

A solution of 0.935 g. (2.0 moles) of 2α-bromo-16α,17α-isopropylidenedioxyprogesterone prepared in Example II and 5 ml. of redistilled collidine is allowed to reflux during 45 minutes; the solution becomes quite black in color and solid separates when the reflux temperature is reached. The cooled mixture is diluted with 10 ml. of ether and filtered. The residue is washed with two 10-ml. portions of ether. The combined filtrate and washings are diluted with an additional 20 ml. of ether, and the ethereal solution is washed with 10% sulfuric acid solution (2 x 50 ml.) and water (50 ml.) and then dried over magnesium sulfate. The solid obtained on removal of the ether is recrystallized from ether to give 0.564 g. (74% yield) of 16α,17α-isopropylidenedioxy-1,4-pregnadiene-3,20-dione as white rods and prisms, melting point 202–204°. An additional recrystallization from ether did not alter this melting range. The material had $[\alpha]_D^{25}+83°$ (c. 1.1, methanol), $\gamma_{max}$ 243 mμ ($\epsilon$=15,200), and $\gamma_{max}$ 5.82, 5.97, 6.11, 6.21, 7.24, 7.28μ. In polarographic assays a solution of the product (c. 1 mg./ml.) in 90% methanol and 0.1 N tetramethylammonium bromide gives a single wave with a half-wave potential of −1.04 volts, whereas its Δ⁴-3-keto counterpart (A) under the same conditions gives a single wave with a half-wave potential of −1.20 volts.

*Example V*

A mixture of 0.544 g. (1.0 mole) of 2α,4-dibromo-16α,17α-isopropylidenedioxyprogesterone as prepared in Example III and 5 ml. of redistilled collidine is allowed to reflux for one hour. The mixture is never free of undissolved solid; however, the originally water-white mixture is dark at the end of the reflux period. Xylene (5 ml.) is added, and the mixture is allowed to reflux for three hours. The hot mixture is filtered, and the filtrate is allowed to cool. The residual solid is washed with three 10-ml. portions of ether and dried to give 0.192 g. (95% yield) of collidine hydrobromide as a grey solid. The ether washings and the filtrate are combined, and this solution is diluted with an additional 50 ml. of ether. The ethereal solution is washed with 10% sulfuric acid solution (2 x 50 ml.) and water (2 x 50 ml.), dried over magnesium sulfate, and taken to dryness. The residue is recrystallized from acetone-petroleum ether to give 0.352 g. (76% yield) of 4-bromo-16α,17α-isopropylidenedioxy-1,4-pregnadiene-3,20-dione as hard crystals, melting point 218–221° C. An addition recrystallization gives hard crystals, melting point 221–223° C.; $[\alpha]_D^{25}+22.8°$ (c. 1.1, chloroform); $\gamma_{max}$ 252 mμ ($\epsilon$=16,500); $\gamma_{max}$ 5.85, 6.00, 6.25, 7.24, 7.28μ.

A slurry of 0.463 g. (1.0 mole) of the above product in 25 ml. of methanol is treated with a solution of 0.790 g. (7.0 mole) of semicarbazide hydrochloride and 0.605 g. (7.7 mole, 0.4 ml.) of pyridine in 4 ml. of water. The solution is allowed to reflux for 20 hours. After 18 hours has elapsed, solid begins to separate. The cooled mixture is filtered to furnish 0.487 g. of white crystals melting point 230–235° C. (gas). A sample is recrystallized from methanol to give the 3-semicarbazone as white needles, melting point 230–232° C. (gas); $\gamma_{max}$ 250, 296 mμ ($\epsilon$=9,250; 32,200).

In polarographic assays a solution of the above product (c. 1 mg./ml.) in 90% methanol and 0.1 N tetramethylammonium bromide gives two waves of equal intensity with half-wave potentials of −1.03 and −1.32 volts, whereas a solution of the 4-bromo-Δ⁴-3-ketone (G) exhibits a single wave with a half-wave potential of −1.27 volts under the same conditions.

*Example VI*

A solution of 0.485 g. (0.9 mole) of 2α,4-dibromo-16α,17α-isopropylidenedioxyprogesterone prepared as in Example III, 0.600 g. of sodium iodide and 100 ml. of acetone is allowed to reflux during six hours. The solution has deposited a small amount of solid and an iodine-like color has developed. The mixture is concentrated to a volume of about 10 ml. and diluted with water. The resulting mixture is diluted with sodium thiosulfate solution, chilled and filtered to give 0.420 g. of 2-iodo-4-bromo-16α,17α-isopropylidenedioxyprogesterone, a pink-colored solid, melting point 145–150° C. dec. after previous darkening.

*Example VII*

A solution of 0.250 g. of the product of Example VI in 5 ml. of collidine is allowed to reflux for 30 minutes. The solution becomes black when the reflux temperature is reached, and a dark solid separated from the solution. The mixture is suspended in 50 ml. of methylene chloride, and this suspension is washed with 10% sulfuric acid solution (2 x 50 ml.) and water (2 x 50 ml.). The organic solution is dried over magnesium sulfate and taken to dryness. The residue is dissolved in 10 ml. of petroleum ether-benzene (1:1) and this solution is adsorbed onto 3 g. of neutral alumina (column size: 0.6 x 20 cm.). The column is washed with petroleum ether-benzene (1:1); 25-ml. fractions are collected.

Fractions 1–3 are combined and the solid contained therein is recrystallized from acetone-petroleum ether to give 46 mg. of 4-bromo-16α,17α-isopropylidene-dioxy- 1,4-pregnadiene-3,20-dione, melting point 219–221° C. The material has $\lambda_{max}$ 252 m$\mu$ ($\epsilon$=15,700).

Fractions 4–12 are taken to dryness and the solids therein are combined and recrystallized from methanol to give 69 mg. of 4-bromo-16α,17α-isopropylidenedioxyprogesterone, melting point 227–228° C. dec. The matrial had $[\alpha]_D^{24}$+149° (c. 2.1, chloroform);

$\lambda_{max}$ 260 m$\mu$ ($\epsilon$=11,400).

Example VIII

A solution of 3.86 g. (0.010 mole) of 16α,17α-isopropylidenedioxyprogesterone (I), 40 ml. of propylene oxide and 10 ml. of a 1 M bromine in acetic acid solution is stored at −20° C. in the dark for 20 hours. The solution is dissolved in 100 ml. of methylene chloride, and the organic solution is washed with water (100 ml.) sodium thiosulfate solution (100 ml.), saturated sodium bicarbonate solution (100 ml.) and finally again with water (100 ml.). The organic solution is then dried over magnesium sulfate and taken to dryness. The solid residue is dissolved in 30 ml. of petroleum ether-benzene (1:1) and this solution is adsorbed onto 11 g. of alkaline alumina (column size: 0.9 x 16 cm.). The column is then washed with petroleum ether-benzene (1:1); 125-ml. fractions are collected. The material eluted in fraction three is recrystallized from acetone-petroleum ether to give 1.75 g. (38% yield) of 4-bromo-16α,17α-isopropylidenedioxyprogesterone as white needles, melting point (299–230° C. dec.; $[\alpha]^{24}$+155° (c. 2.0, chloroform) $\lambda_{max}$ 260 m$\mu$ ($\epsilon$=12,000); $\lambda_{max}$ 5.81, 5.90, 6.32, 7.24, 7.26, 8.25, 9.55 m$\mu$.

When ether-collidine is substituted for the propylene oxide, the yield of the bromo compound above drops to 32%.

The 4-bromo-16α,17α-isopropylidenedioxyprogesterone is recovered to the extent of 92% after treatment with chromous chloride.

When this ketone is treated with 2,4-dinitrophenylhydrazine in acetic acid on the steam bath for three minutes, orange crystals separate. This material was recrystallized twice from chloroform-ethanol to give orange needles, melting point 29–292° C. dec.; $\lambda_{max}$ 378 m$\mu$ $(E_{1\,cm.}^{1\%}=500)$ Analyses showed that a portion of the bromine was removed during this brief treatment.

Example IX

A mixture of 1.000 g. (2.15 moles) of 4-bromo-16α,17α-isopropylidenedioxyprogesterone, 0.360 g. (8.5 moles) of anhydrous lithium chloride and 10 ml. of collidine is allowed to reflux for two hours. The mixture is never free of undissolved solid, but when reflux temperature is reached additional solid separates and the mixture becomes darker in color. The cooled mixture is filtered after dilution with 5 ml. of ether, and the residue is washed thoroughly with 50 ml. of ether. The combined ethereal solutions are washed with 10% sulfuric acid solution (2 x 50 ml.) and water (50 ml.), dried over magnesium sulfate and taken to dryness. The residue is dissolved in the minimum necessary amount of benzene-petroleum ether (1:1) and adsorbed onto a column prepared from 10 g. of neutral alumina (column size: 0.9 x 14 cm.). The column is washed with benzene-petroleum ether (1:1); 50 ml. fractions are collected. The material contained in fractions 1–5 is combined and recrystallized from acetone-petroleum ether to give 0.189 g. (23% yield) of 16α,17α-isopropylidenedioxy-4,6-pregnadiene-3,20-dione as crystals, melting point 211–214° C. One additional recrystallization raised the melting range to 214–216°. The material had $[\alpha]_D^{25}$+84° (c. 1.30, chloroform);
$\lambda_{max}$ 282 m$\mu$ ($\epsilon$=23,800);

$\lambda_{max}$ 5.85, 6.00, 6.17, 6.31, 7.24, 7.28 $\mu$.

Example X

A solution of 0.75 g. (1.62 moles) of 2α-bromo-16α,17α-isopropylidenedioxyprogesterone prepared as in Example II in 15 ml. of ether and 5 ml. of collidine is treated with 6.5 ml. of 1 M bromine in acetic acid solution and allowed to stand in the dark at room temperature for 50 hours. The resulting mixture is distributed between 75 ml. of methylene chloride and 75 ml. of water. The organic solution is washed successively with 50 ml. of 5% hydrochloric acid solution, 50 ml. of saturated sodium bicarbonate solution, 50 ml. of saturated sodium thiosulfate and 50 ml. of water. The organic layer is taken to dryness after drying over magnesium sulfate to give a residue which crystallizes when triturated with 20 ml. of ether. The solid is recrystallized from benzene-petroleum ether to give 0.508 g. (58% yield) of crystals, melting point 168–170° C. dec. alone or when mixed with the dibromoketone prepared by bromination of the ethoxalyl derivative. To decolorize this material it is dissolved in benzene and adsorbed onto a column prepared from 15 g. of silica gel (column size: 1.4 x 14.5 cm.). The column is eluted with a 3% ether-in-benzene solution; 100-ml. fractions are collected. The material contained in fractions 1–4 is combined and recrystallized from benzene-petroleum ether to give 0.458 g. of 2α,4-dibromo-16α,17α-isopropylidenedioxyprogesterone, white prisms, melting point 170–172° C. dec. The solid has $\lambda_{max}$ 225 m$\mu$ ($\epsilon$=13,100) and $[\alpha]_D^{25}$+23.8° (c. 1.05, chloroform) and its infrared spectrum is identical with that of the dibromoketone prepared from the ethoxalyl derivative.

Example XI

A mixture of 0.926 g. (2.0 moles) of 4-bromo-16α,17α-isopropylidenedioxy-1,4-pregnadiene-3,20-dione prepared in Example V and 80 mg. of 5% palladium-on-barium carbonate catalyst in 80 ml. of methanol is magnetically stirred under at atmosphere of hydrogen until one molar equivalent of the gas is consumed. The mixture is filtered, and the solvent is removed from the filtrate. Trituration of the gummy residue with ether gives 162 mg. of water-soluble, non-ultraviolet absorbing inorganic halide; this material is discarded. Concentration of the ether filtrate gives 0.120 g. of crude starting material as needles, melting point 192–215° C. dec. Recrystallization of this material from acetone-petroleum ether gave needles of 4-bromo-16α,17α-isopropylidenedioxyprogesterone, melting point 215–218°; $\lambda_{max}$ 252 m$\mu$ ($\epsilon$=15,700). The infrared spectrum of the material is the same as that of the starting material, and a mixture of this material with the starting ketone (melting point 221–223° C.) melted at 215–218° C.

The ether is removed from the reaction filtrate, and the residue is dissolved in the minimum quantity of benzene-petroleum ether (1:1) and adsorbed onto a column prepared from 6 g. of neutral alumina and petroleum ether (column size: 0.6 x 20 cm.). The column is eluted with benzene-petroleum ether (1:1), 10-ml. fractions being collected. Fractions 1–4 are combined and the material contained therein is crystallized from acetone-petroleum ether. Two recrystallizations from this solvent pair gives 56 mg. of needles, melting point 212–214° C. $\lambda_{max}$ 252 m$\mu$ ($\epsilon$=13,400). A mixture of this material with starting ketone melted at 212–215° C.; and its infrared spectrum is essentially the same as that of the starting material. However, the appearance of a shoulder at 5.88 $\mu$ in its spectrum indicated the prescence of an impurity.

Fractions 5–11 are combined and taken to dryness. The residual gum crystallizes upon seeding with 4-bromo-16α,17α-isopropylidenedioxyprogesterone. This material is recrystallized four times from acetone-petroleum ether to give 0.213 g. (22% yield) of needles, melting point 227–229° dec. The material has $\lambda_{max}$ 259 m$\mu$ ($\epsilon$=10,700).

In the preceding examples all melting points were determined in a capillary tube and are uncorrected. The ultraviolet spectra were determined in methanol solution on a Cary recording spectrophotometer. The infrared spectra (pressed potassium bromide disc) were determined with a Perkin-Elmer spectrophotometer (Model 21). Optical rotations were determined in a 1-dm. semi-micro tube, and all evaporations were carried out under reduced pressure unless otherwise specified. Except where otherwise noted, the petroleum ether used was that fraction boiling at 60–70°.

We claim:
1. The compound 2α-bromo-16α,17α-isopropylidenedioxyprogesterone.
2. The compound 2α,4-dibromo-16α,17α-isopropylidenedioxyprogesterone.
3. The compound 16α,17α-isopropylidenedioxy-1,4-pregnadiene-3,20-dione.
4. The compound 4-bromo-16α,17α-isopropylidenedioxy-1,4-pregnadiene-3,20-dione.
5. The compound 4-bromo-16α,17α-isopropylidenedioxyprogesterone.
6. The compound 16α,17α-isopropylidenedioxy-4,6-pregnadiene-3,20-dione.
7. A compound having the formula:

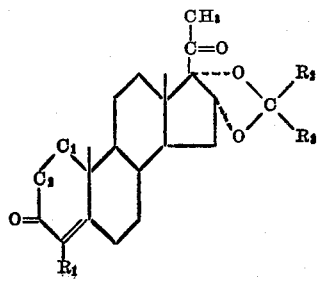

wherein —$C_1$—$C_2$— is selected from the group consisting of $$I-\underset{|}{CH}-\underset{2}{CH_2}-,\quad Br-\underset{|}{CH}-\underset{2}{CH_2}-,\quad -\underset{|}{CH}=\underset{2}{HC}-\quad \text{and}\quad -\underset{2}{CH_2}-\underset{|}{CH_2}-$$

$R_1$ is selected from the group consisting of hydrogen and bromine and when —$C_1$—$C_2$— is $$-\underset{2}{CH_2}-\underset{|}{CH_2}-$$

then $R_1$ is bromine, and $R_2$ and $R_3$ are lower alkyl radicals.

References Cited in the file of this patent
UNITED STATES PATENTS
2,895,969     Ringold et al. _____ July 21, 1959

OTHER REFERENCES
Cooley et al.: J. Chem. Soc. (London), December, 1955, pages 4373–4377 (pages 4373 and 4374 necessary).
Bernstein et al.: J. Am. Chem. Soc., vol. 81 (Sept. 5, 1959), pages 4573 and 4574.

UNITED STATES PATENT OFFICE
CERTIFICATION OF CORRECTION

Patent No. 3,001,991                                          September 26, 1961

George R. Allen et al.

It is hereby certified that error appears in the above numbered patent requiring correction and that the said Letters Patent should read as corrected below.

Column 7, line 43, for "29-292° C." read -- 290-292° C. --; column 8, line 2, for "0.75" read -- 0.755 --; column 10, lines 4 and 5, should appear as shown below instead of as in the paten Signed and sealed this 17th day of April 1962.

(SEAL)
Attest:

ESTON G. JOHNSON
Attesting Officer

DAVID L. LADD
Commissioner of Patents